_United States Patent_ [19]

Staton et al.

[11] Patent Number: 5,372,621
[45] Date of Patent: Dec. 13, 1994

[54] CONDENSATE TRAP FOR VAPOR EXTRACTION SYSTEM

[75] Inventors: Michael D. Staton, Seattle; Peter Seybert, Renton; Angela Côte, Kirkland, all of Wash.

[73] Assignee: Emcon, Inc., San Mateo, Calif.

[21] Appl. No.: 76,016

[22] Filed: Jun. 14, 1993

[51] Int. Cl.⁵ .................... B01D 50/00; B01D 45/04
[52] U.S. Cl. ......................................... 55/218; 55/319; 55/329; 96/140; 96/179; 96/190; 96/206
[58] Field of Search ................. 95/117, 247, 248, 260, 95/262; 96/134, 139, 140, 142, 168, 171, 178, 179, 189, 190, 206; 55/218, 219, 319, 329, 332

[56] References Cited

U.S. PATENT DOCUMENTS

| | | | |
|---|---|---|---|
| 548,458 | 10/1895 | Reynolds . | |
| 1,458,005 | 6/1923 | Rohrer | 55/319 |
| 1,461,045 | 7/1923 | Paasche | 55/319 |
| 2,039,411 | 5/1936 | Hartley | 95/248 |
| 3,071,148 | 1/1963 | Woodmansee . | |
| 3,246,455 | 4/1966 | Boddy | 55/319 |
| 3,516,231 | 6/1970 | George | 55/267 |
| 3,527,027 | 9/1970 | Knight et al. | 96/134 |
| 3,626,672 | 12/1971 | Burbidge | 96/189 X |
| 3,778,977 | 12/1973 | Conn | 55/219 |
| 3,847,573 | 11/1974 | Gandrud | 55/319 |
| 4,052,178 | 10/1977 | Frantz | 55/212 |
| 4,092,137 | 5/1978 | Howe et al. | 96/190 |
| 4,297,116 | 10/1981 | Cusick | 55/319 |
| 4,303,422 | 12/1981 | Persinger | 55/319 X |
| 4,361,425 | 11/1982 | Hata | 96/140 |
| 4,500,329 | 2/1985 | Campolie et al. | 55/218 X |
| 4,934,393 | 6/1990 | Lighthall et al. | 134/104.4 |
| 4,963,169 | 10/1990 | Granville | 96/178 |
| 5,017,199 | 5/1991 | Etchepare | 55/57 |

FOREIGN PATENT DOCUMENTS

| | | | |
|---|---|---|---|
| 483283 | 5/1952 | Canada | 95/117 |
| 1127824 | 4/1962 | Germany | 55/319 |

_Primary Examiner_—Robert H. Spitzer
_Attorney, Agent, or Firm_—Paul L. Griffiths

[57] ABSTRACT

A condensate trap for use in a Vapor Extraction System (VES), which uses negative pressure to extract contaminated vapors from soil, is disclosed. The trap includes a vapor tight vessel, part of which acts as a condensate reservoir. One or more mist eliminators, such as an impingement type condensate collector, are contained within the vessel. The vessel includes a vapor inlet and a vapor outlet as well as a condensate outlet. The condensate outlet is controlled by a swing check valve. The valve remains closed until there is sufficient condensate in the reservoir to push it open. After a predetermined amount of condensate drains out, the check valve closes.

14 Claims, 1 Drawing Sheet

CONDENSATE TRAP FOR VAPOR EXTRACTION SYSTEM

TECHNICAL FIELD

The present invention relates to a condensate trap for removing mist and condensate from a vapor laden airstream. In particular, the invention relates to the removal of moisture while automatically draining accumulated condensate out of a vapor extraction system without disturbing the vacuum within the system.

BACKGROUND ART

The need to clean up our environment has led to the development of new methods and apparatus designed to solve the problems encountered in the cleanup effort. A major environmental problem is the contamination of surface and subsurface soils. This type of contamination can occur by either dumping contaminants on the surface or by leaking underground storage tanks. Perhaps the most widespread form of contamination is caused by leakage from underground tanks in the gasoline distribution industry. One method of cleaning up this type of pollution involves the use of a vapor extraction system (VES). A typical VES uses slotted and screened piping buried within contaminated soil and in turn connected to a manifold and blower. The blower produces a vacuum (a pressure lower than atmospheric, measured in inches of water column) in the piping system, thereby withdrawing volatile contaminant vapors from within contaminated soils. The soil being treated can be either subsurface soil or soil that has been excavated into a stockpile.

A significant amount of moisture is withdrawn along with the volatile vapors being extracted from the soil. In order to insure that there is no moisture or condensate build up within the system that could damage the VES blower, a condensate trap or collector is used to safeguard the system. Generally speaking, the blower is driven by an electric motor that can be severely damaged by condensate. The blowers are also susceptible to corrosive damage caused by condensate. In order to increase reliability and reduce costs of a VES, it is important to protect the blower from condensate.

A typical condensate collector consists of one or more 35 or 55 gallon drums. Each drum normally has an air/vapor inlet on the side of the drum which is connected to the VES manifold: an air outlet at the top of the drum that is connected to the vacuum pressure side of the VES blower; and a manual condensate drain valve at the base of the tank which is used to drain any condensate that collects within the tank. In the majority of applications the drums fill with condensate at a rate that requires service intervals to be based on draining the drums rather than on other factors. Since the length of the service interval directly effects the cost of running the VES, the longer the interval, the lower the cost. If the drums are not emptied on a short enough time interval, the system may shut down between site visits. A VES system shuts down due to the loss of suction created when a high condensate level in the tank activates an automatic shutoff on some of the condensate tanks. Other systems fail due to condensate passing through condensate tanks not equipped with an automatic shutoff, thereby damaging the blower.

A condensate collector automatic shutoff valve is an internal valve connected to the air outlet connection through a bulkhead fitting. The automatic shutoff includes a two inch inside diameter cylinder suspended from the tank's lid and a floatation ball within the cylinder that rises as the condensate level rises in the collector unit. At a predetermined level of condensate, the floatation ball will engage the suspended pipe and automatically block the transfer of condensate to the blower, thereby removing the effect of condensate induced blower damage. The vacuum level at which the automatic shutoff would activate is typically 15 inches of water column.

The collectors currently used also corrode on the inside, producing rust flakes which foul the manual or check valve over time. Iron bacteria in the tanks can also foul the valves, causing them to malfunction. When a check valve malfunctions, preventing the tanks from draining properly, the service interval must be shortened in order to ensure that the system continues to operate.

SUMMARY OF THE INVENTION

In order to increase the service interval, a condensate trap for removing, collecting and automatically draining condensate within the VES is disclosed. The condensate trap comprises a vapor tight vessel which includes a condensate reservoir. The vessel has an air/vapor inlet connected to a collection manifold and an outlet connection to a vacuum blower. A check valve is connected to the condensate reservoir whereby the condensate level within the reservoir is controlled by the vacuum pressure in the reservoir. As the water level rises in the condensate reservoir it overcomes the vacuum pressure thereby opening the check valve and allowing condensate to drain until the vacuum pressure equals the condensate level, in inches of water column, and the valve closes. By maintaining a predetermined amount of water within the condensate reservoir, a vapor tight seal is ensured.

The trap uses an impingement type moisture collector connected to the air/vapor inlet within the vessel. The collector may act to combine vapor molecules into droplets, depending upon the psychometric conditions of the air/vapor. An additional moisture collection element may be used in conjunction with the impingement type collector or employed by itself. This additional collection element comprises a wire packing.

It is an object of the present invention to allow a VES to operate continuously for long periods of time without periodic maintenance. It is also an object of the present invention to provide a condensate trap having a size and weight such that it can be easily mounted within a VES enclosure, e.g., on the enclosure's fence, thereby allowing the condensate draining therefrom to flow directly (via gravity) into a condensate treatment system.

BRIEF DESCRIPTION OF THE DRAWING

In the drawings, like reference numerals and characters refer to like parts throughout the various views, and wherein.

BEST MODE FOR CARRYING OUT THE INVENTION

Figure 1:
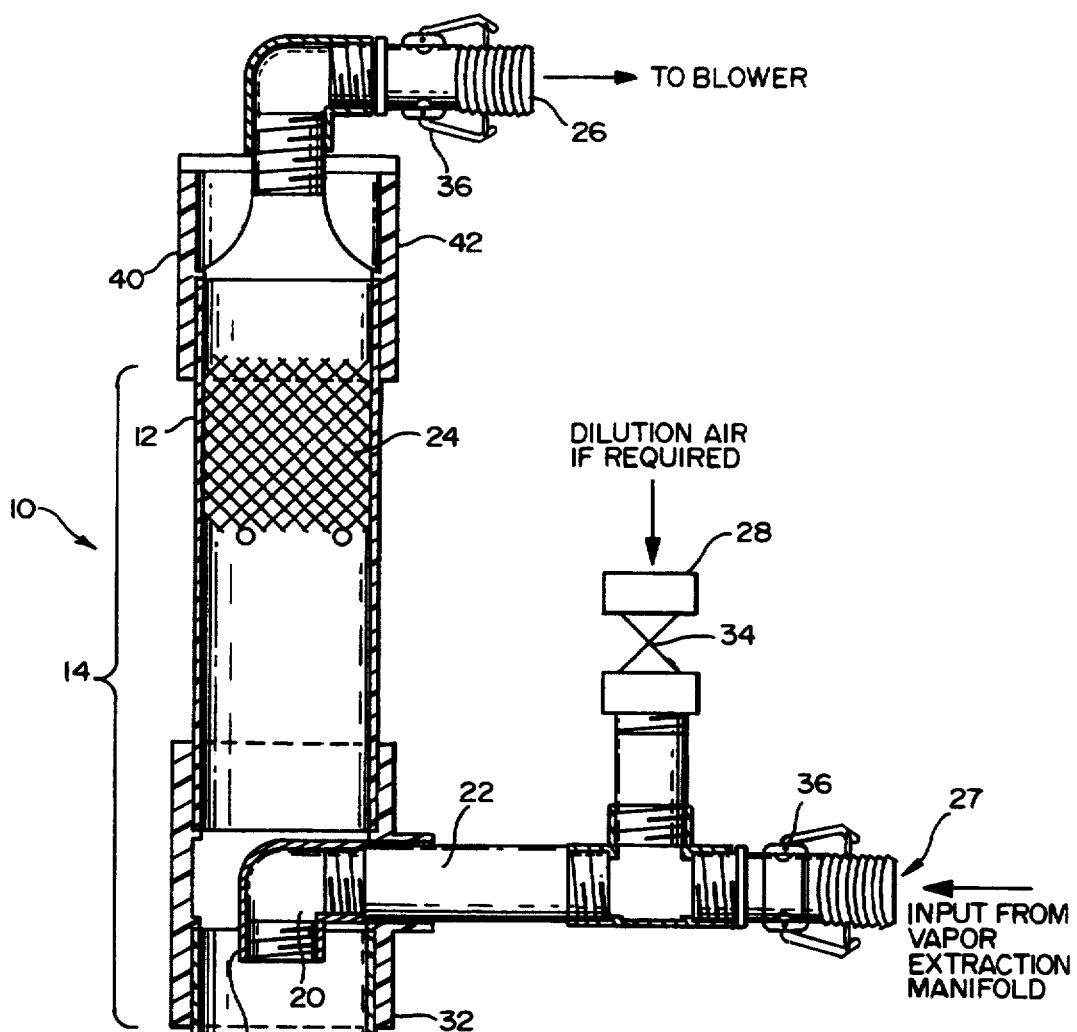
FIG. 1 is a sectional view of the preferred embodiment of the invention.

Referring now to FIG. 1, shown at 10 is a condensate trap in accordance with the preferred embodiment of the invention. The condensate trap is used with a vapor extraction system (VES)(not shown). Condensate trap 10 includes a vessel 12 that forms two basic compartments. A mist elimination section 14 is formed by an upper portion of vessel 12 and a liquid reservoir 16 is formed by a lower portion of vessel 12. A swing check valve 18 is positioned at or near the lowest point of reservoir 16.

In the preferred embodiment, mist elimination section 14 includes two separate means for collecting liquid droplets or moisture, which may be in the form of vapor molecules. An impingement collector 20 is formed from a 90° elbow placed over the end of vapor inlet 22. A wire packing 24 type of mist eliminator is located within an upper portion of vessel 12, at a location above collector 20. A vapor outlet 26 provides a fluid path connection to the VES blower (not shown). Vapor inlet 27 includes a dilution air inlet 28 for allowing atmospheric air into the vapor stream if needed, such as to reduce the amount of volatile organic compounds (VOC's) dispersed into the air by the VES, as may be required by the EPA or local codes.

Referring again to FIG. 1, the construction of the invention will now be discussed. Vessel 12 is constructed using plastic pipe, such as PVC or the like, although any corrosion resistant material may be used. The pipe is sized to match the capacity of the VES blower being used. The liquid reservoir is formed by mounting an end cap 30 to an end of vessel 12, such as by gluing, to form a liquid and vapor tight joint. All of the joints made during assembly may be made by using one of the following: gluing or the like, ultrasonic, heated (causing the joints to De melted or welded together), or the components may be threaded using an appropriate sealing compound. A hole 17 is formed in end cap 30 and fitted with a connector tube. It is preferred that check valve 18 have a body made from PVC with a sealing surface made from buna-N. An acceptable check valve is manufactured by Flo Control, Inc, of Burbank, Calif. In the preferred embodiment, check valve 18 should have a minimum flow channel diameter that is approximately one-sixth (1/6) the diameter of the diameter of liquid reservoir 16. Check valve 18 is oriented to prevent atmospheric air (pressure) from flowing into vessel 12.

Vapor inlet 22 is formed in vessel 12 by cutting the vessel pipe and inserting a T fitting 32 having a perpendicular opening sized to match the pipe size of the vapor extraction manifold. Alternatively, vessel 12 may be formed by joining two pieces of pipe using fitting 32. A dilution valve 34 is attached to vapor inlet 22 at a point outside of vessel 12. Dilution valve 34, may be a manual or automatic valve. A quick disconnect fitting 36 is shown for connection to the VES manifold.

A 90° elbow 38 is attached to vapor inlet 22 within mist elimination section 14 and acts as impingement collector 20. Elbow 38 is pointed toward reservoir 16 such that any liquid drops formed in the elbow are directed toward the reservoir and urged to flow by gravity.

Located at a position above impingement collector 20 is mist eliminator 24. Wire mesh mist eliminator 24 is made from 304 stainless steel wire having a diameter of 0.006 inches. The mesh is formed into cylindrical shape having a density of approximately 12 pounds per cubic foot. While a specific type and size of wire have been specified, as any person skilled in the art would readily understand, any corrosion resistant wire, and other sizes of wire, could be readily substituted. The eliminator is sized to fit snugly within mist elimination section 14. Eliminators of this type are manufactured by ACS Industries, Inc., of Houston, Tex. Any form of molecular sieve could also be used, so long as it is corrosion resistant.

Top end 40 of vessel 12 is capped off and sealed by a reducer fitting 42. Reducer 42 also forms vapor outlet 26. A quick disconnect fitting 36 is used to connect outlet 26 to the VES. Top end 40 of vessel 12 may also be constructed in a manner similar to reservoir 16 and outlet 26 as described above.

Operational aspects of condensate trap 10 will now be described. The trap is designed to be used in conjunction with a VES. The purpose of the trap is to prevent liquid, mostly entrained water droplets, from reaching the VES blower and associated motor, thereby preventing damage thereto. Vapor inlet 22 is connected via appropriate piping to the VES extraction manifold. The manifold is located within soil contaminated by a pollutant such as volatile organic compounds. Vapor outlet 26 is connected by appropriate piping to the VES blower. When the blower is turned on, a vacuum (pressure less than one atmosphere) of between 5 and 50 inches water column builds up within vessel 12. Liquid reservoir 16 is typically 50 inches long. The length is selected based on the diameter of reservoir 16 and the maximum vacuum pressure selected for a given site. The length of reservoir 16 is adjusted to ensure that a sufficient volume is available in reservoir 16 such that water collected therein does not interfere with mist elimination section 14.

Check valve 18 is pulled to a closed position by the vacuum pressure in vessel 12. Depending on EPA and local regulations, dilution air inlet 28 is used to bleed atmospheric air into the vapor stream. As vapors are drawn into impingement collector 20, any large water droplets impinge onto elbow 38, collect together and form a droplet which drops into liquid reservoir 16. Liquids other than water may also be present and the water may be contaminated by these liquids or other contaminants. Since the vapor stream is at a pressure below one atmosphere, depending on the psychometric condition of dilution air (if any), the vapor stream may be in a physical state where condensation may occur on elbow 38.

As the vapor stream rises within mist elimination section 14, it encounters wire mesh packing mist eliminator 24. Any fine droplets of moisture collect on the surfaces of the wires. The droplets collect together until a drop is formed and falls into reservoir 16. Again, depending on the psychometric conditions of the vapor stream, some condensing of moisture may occur within wire packing 24.

As the water level in reservoir 16 increases, the force of the water begins to apply outward pressure on check valve 18. Negative pressure (acting in combination with atmospheric pressure) holds valve 18 closed until the positive pressure applied by the column of water in reservoir 16 overcomes the vacuum in vessel 12. When this occurs, valve 18 opens and the water in reservoir 16 is discharged through valve 18. When the pressure equalizes, valve 18 closes and the water level in reservoir 16 begins to rise until the cycle repeats.

We claim:

1. A condensate trap for use in a vapor extraction system (VES) comprising:

a vapor tight vessel, said vessel having an inlet and outlet means in fluid communication with a vapor extraction system including a vacuum pump for providing a negative pressure within said VES, a means for combining vapor molecules into droplets located within said vessel, said droplets forming a pool of liquid in a bottom portion of said vessel, and a check valve in fluid flow communication with said bottom portion of said vessel on one side and atmospheric air pressure on the other side, said valve positioned such that when said pool of liquid reaches a predetermined height in said vessel, as determined by said negative pressure therein along with atmospheric pressure, whereby said check valve will be forced open by said pool of liquid thereby draining said pool until such time as said negative pressure within the system along with atmospheric pressure closes said check valve.

2. The trap of claim 1, wherein said means for combining vapor molecules includes an impingement type collector.

3. The trap of claim 2, wherein said impingement type collector includes a 90° elbow directed toward said bottom portion of said vessel to urge flow by gravity.

4. The trap of claim 2, wherein said impingement type collector includes a wire packing mesh.

5. The trap of claim 1, wherein said vapor tight vessel is formed from a length of tubing having a relatively small cross-sectional area in relation to its length, whereby said pool of liquid reaches said predetermined height to open said check valve such that said pool of liquid does not interfere with said means for combining vapor molecules.

6. The trap of claim 1, wherein said trap is operational when said VES is operating at a vacuum pressure of between 5 and 60 inches water column.

7. A condensate trap, for removing and collecting moisture, in a vacuum extraction system, comprising:

a vapor tight vessel, said vessel having a condensate reservoir, an air/vapor inlet and outlet to a vacuum extraction system including a vacuum means for placing said vessel under a negative pressure, each in fluid communication with said vessel, a check valve, said check valve being in fluid communication with said reservoir, whereby said check valve opens when said condensate reaches a predetermined level in said condensate reservoir, and closes when a predetermined amount of condensate has drained therefrom.

8. The trap of claim 7, wherein an impingement type moisture collector is connected to said air/vapor inlet such that droplets formed therein can pass into said condensate reservoir.

9. The trap of claim 8, wherein said impingement type collector includes a 90° elbow.

10. The trap of claim 8, wherein said impingement type collector includes a wire mesh packing.

11. The trap of claim 8, wherein said vapor tight vessel is constructed of corrosion resistant materials.

12. The trap of claim 11, wherein said corrosion resistant material includes PVC pipe and fittings.

13. The trap of claim 7, wherein said vessel includes a molecular sieve located between said air/vapor inlet and said outlet connection to the vapor extraction system, such that air and vapor passing therethrough are separated.

14. The trap of claim 7, wherein a swing check valve includes a corrosion resistant body and valve plate, said valve plate includes a flexible seal member.

* * * * *